INVENTOR.
H. M. HAWKINS
BY Hudson and Young
ATTORNEYS

INVENTOR.
H. M. HAWKINS

United States Patent Office
3,017,751
Patented Jan. 23, 1962

3,017,751
CONCENTRATION OF AQUEOUS SOLUTIONS
Harold M. Hawkins, Bartlesville, Okla., assignor to Phillips Petroleum Company, a corporation of Delaware
Filed Apr. 25, 1960, Ser. No. 24,510
13 Claims. (Cl. 62—58)

This invention relates to a method and means for concentrating an aqueous solution with concomitant production of water separated from the solution. In one aspect this invention relates to the recovery of fresh water from sea water. In another aspect this invention relates to the concentration of aqueous solutions and dispersions such as orange juice, milk, and the like.

Various methods of concentrating aqueous solutions by removing water therefrom have proved successful where the concentrated product recovered has warranted the costs of the operation. It has been proposed that some of these methods be applied to the production of fresh water from sea water; however, the cost of such operations has prevented more than limited use because of the high cost of the water produced.

Figure 1:
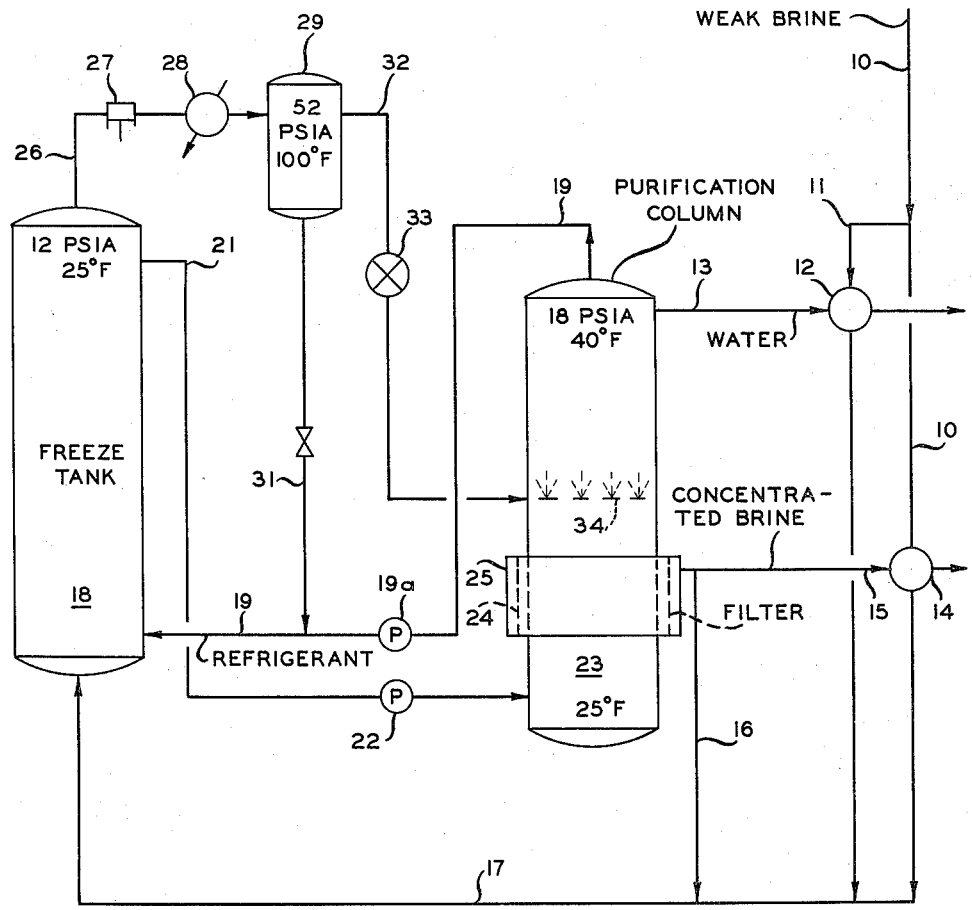
Figure 2:
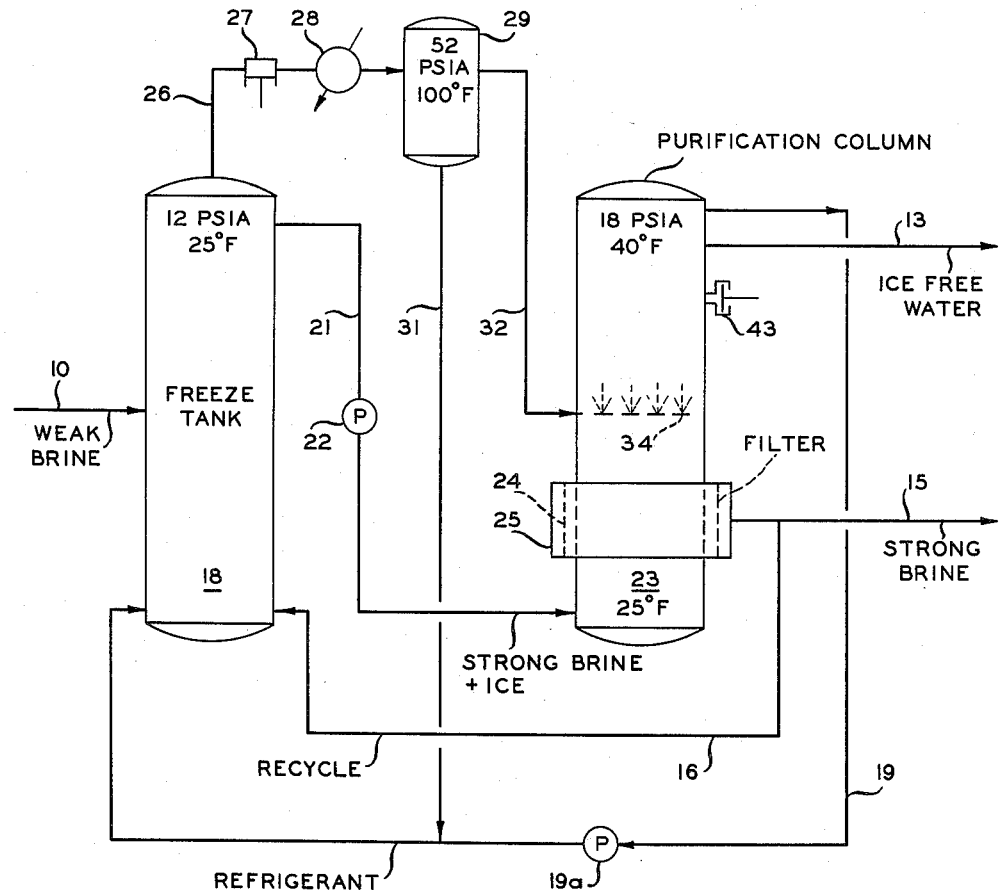

It is therefore a principal object of this invention to provide a method and means for the recovery of water from a brine such as sea water at less cost than has heretofore been possible. A further object of this invention is a method and means for the removal and recovery of water from an aqueous solution with a minimum of expended energy. It is a further object of this invention to provide a method and means for the removal and recovery of water from an aqueous solution utilizing materials which are economical and abundant. A still further object of this invention is the provision of a method and means for concentrating an aqueous solution. Other objects and advantages of this invention will be apparent to one skilled in the art upon study of the disclosure including the detailed description of the invention and the appended drawing wherein:

FIGURE 1 is a diagrammatic flow sheet of a preferred embodiment of the invention; and FIGURE 2 illustrates a modification of the embodiment of FIGURE 1.

In the drawing like elements will be referred to with like numerals wherever applicable in the figures which constitute the drawing. In order to simplify the drawing various auxiliary elements, such as valves, temperature and pressure gages, motors, control instruments, and the like, are not shown but can readily be supplied where needed by one skilled in the art.

The drawing will be described as applied to the recovery of fresh water from sea water, using normal butane as the refrigerant. Sea water enters as the weak brine in the process via conduit 10. A portion of the stream is diverted to conduit 11 and passes through heat exchanger 12 where it is cooled by indirect heat exchange with the product water being recovered via conduit 13. The remaining portion of the stream in conduit 10 is passed through heat exchanger 14 where it is cooled by indirect heat exchange with the concentrated brine being disposed via conduit 15. A portion of the concentrated brine in conduit 15 is diverted to conduit 16 and the brine in conduits 10, 11 and 16 is joined and passed through conduit 17 to the lower portion of freeze tank 18. Liquid refrigerant is passed via conduit 19 to the lower portion of freeze tank 18 wherein it vaporizes and freezes a portion of the water in the brine so as to form a slurry of ice crystals in concentrated brine. The slurry of ice crystals in brine is withdrawn from the upper portion of freeze tank 18 via conduit 21 and passed by means of pump 22 to the lower portion of crystal purification column 23. A filter 24, comprising a perforated section of the purification column 23, is situated in the lower portion of crystal purification column 23 and is enclosed by a bustle ring 25 so that as the slurry of ice crystals and brine passes upwardly through the column the brine is withdrawn from the column through the filter 24 and is passed from the bustle ring 25 to the disposal conduit 15.

Vaporized refrigerant is removed from the upper portion of freeze tank 18 via conduit 26, is compressed by compressor 27, partially condensed in condenser 28 and is passed to accumulator 29 wherein refrigerant is collected in both liquid and gaseous phases. Liquid refrigerant is drawn off via conduit 31 and returned to freeze tank via conduit 19. Vaporized refrigerant is withdrawn from accumulator 29 via conduit 32 and passed through a pulsating valve 33 to a vapor distributing means 34 positioned in crystal purification column 23 at a point above the filter 24. Valves which transmit a pulsating flow of fluid are known and a star valve, which is one form of pulsating valve, is shown as the pulsating valve 33.

The vaporized refrigerant entering the purification column at distributor means 34 melts the ascending mass of ice crystals so that a portion of the liquid water rises to the upper portion of the column and another portion of the liquid water is displaced downwardly through the ascending mass of ice crystals, washing therefrom the occluded brine solution. The downwardly passing water eventually refreezes and ascends through the column as a portion of the mass of ice crystals. The vaporized refrigerant, having given up its heat to melting the ice crystals, is condensed to liquid and rises with the liquid water to form a separate liquid phase in the upper portion of the crystal purification column 23. The liquid water which collects in the upper portion of the column is substantially free from salt and is withdrawn via conduit 13 and recovered as product. The liquid refrigerant which collects in the top of the column is withdrawn via conduit 19 and returned to freeze tank 18.

In the process described with respect to FIGURE 1, normal butane is used as the refrigerant for the recovery of fresh water from sea water. In the operation of such a process it is essential that energy costs be minimized. This is accomplished by minimizing the temperature difference between the heat source (brine from which ice crystals are frozen) and the heat sink (ice crystals to be melted) by directly contacting, without heat exchange surfaces, the refrigerant with the heat source and the heat sink. A slurry of concentrated brine and ice crystals is transferred continuously from the freeze tank to the purification column and as this slurry is passed through the purification column it passes through a consolidation and washing zone wherein the ice crystals are continuously washed as they pass a brine-water interface and are consolidated into a mass of substantially pure ice crystals. Concentrated brine is continuously removed by filtration. The mass of ice crystals is melted by contact with the vaporized refrigerant which is concomitantly condensed to liquid.

The pulsating refrigerant vapor stream entering the purification column forces part of the purified water down through the ascending ice crystals to provide the washing action which removes occluded brine from the ascending ice crystals.

The following tabulated plant balance of an operation as applied to the process illustrated in FIGURE 1 demonstrates the efficiency of the process and the small temperature differential possible in carrying out the process.

TABLE I

*Plant balance*

| Stream | Temperature, °F. | Pressure, p.s.i.a. | H₂O, Liquid—Pounds | H₂O, Ice—Pounds | NaCl—Pounds | C₄, Liquid—Pounds | C₄, Vapor—Pounds | Total Pounds |
| --- | --- | --- | --- | --- | --- | --- | --- | --- |
| 10 | 60 | | 970.0 | | 30.0 | | | 1,000.0 |
| 16 | 25 | | 1,410.9 | | 89.1 | | | 1,500.0 |
| 17 | 31 | | 2,380.9 | | 119.1 | | | 2,500.0 |
| 21 | 25 | | 1,880.9 | 500.0 | 119.1 | | | 2,500.0 |
| 15 | 25 | | 470.0 | | 29.7 | | | 499.7 |
| 13 | 40 | | 500.0 | | 0.3 | | | 500.3 |
| 19 | 40 | 18 | | | | 410 | | 410 |
| 31 | 100 | 52 | | | | 162 | | 162 |
| 26 | 25 | 12 | | | | | 572 | 572 |
| 32 | 100 | 52 | | | | | 410 | 410 |

A modification of the process described in FIGURE 1 is shown in FIGURE 2 wherein the weak brine which enters via conduit 10 passes directly to freeze tank 18 and the pressure pulsations introduced to crystal purification column 23 are produced by piston pump indicated at 43 which communicates with the substantially liquid full interior of purification column 23. Thus, the reciprocating piston 43 of FIGURE 2 is substituted for the pulse valve 33 of FIGURE 1.

The invention has been described as applied to the preferred embodiment of recovering fresh water from sea water, using normal butane as the refrigerant. Butane is a preferred refrigerant because of the small difference in the boiling point of the refrigerant at low pressure and the freezing point of water; however, other refrigerants are applicable in the practice of this invention. Other preferred refrigerants include propane; isobutane; the butenes, e.g., 1-butene; the butadienes, e.g., 1,3-butadiene; the butynes, e.g., ethyl acetylene; the various polychlorofluoromethanes (Freons); halogenated hydrocarbons, e.g., ethyl chloride; and the like. Any refrigerant having a vapor pressure of about ½ to about 5 atmospheres at temperatures in the range of from about 20 to 32° F., which are essentially insoluble in water at these conditions and which have a specific gravity less than 1.0 can be utilized advantageously in the practice of this invention. Refrigerants which have limited solubility in water, such as $CO_2$ and binary mixtures of $CO_2$ and hydrocarbons such as pentane can be selected so as to provide a refrigerant having the properties of the preferred refrigerants hereinbefore defined. When utilizing refrigerants having appreciable solubility in water, it will usually be advantageous to include steps for recovering the refrigerant from the salt-free water and the brine streams removed from the system.

The invention is not limited to the recovery of fresh water from sea water but can also be applied to the concentration of any aqueous solution, for example, the concentration of fruit juices, milk, sugar solutions, and the like. The temperatures and pressures employed will be those required to vaporize the liquid refrigerant in the freeze tank to form ice crystals in the solution to be concentrated and to melt the ice crystals in the purification column to form liquid water and liquid refrigerant.

The advantage of using normal butane which has a vapor pressure of 15 p.s.i.a. at 32° F. becomes apparent because the freeze tank can be operated at slightly less than atmospheric pressure and the purification column can be operated at slightly more than atmospheric pressure. Compression of the vaporized normal butane withdrawn from the freeze tank is substantially the only energy requirement for the process. When the freeze tank is operated at atmospheric pressure or greater, a pump is required to feed the brine to the freeze tank.

The freeze tank can be operated at about 3 or more p.s.i.a., e.g., 3 to 10 p.s.i.a., below the vapor pressure of the refrigerant at 32° F. and the purification column can be operated at about 3 or more p.s.i.a, e.g., 3 to 10 p.s.i.a. above the vapor pressure of the refrigerant at 32° F.

The pulsating pressure which is maintained on the contents of the purification chamber serves to cause a portion of the purified water to descend through the ascending mass of ice crystals and wash the occluded brine therefrom. The pulsing pressure is reflected in a pulsing stream of concentrated brine withdrawn through the filter. The effect of this backwash of crystals can be increased by taking the liquid refrigerant stream and the purified water stream from the chamber through orifices to dampen the pulsations. This may also be desirable in those instances where the volume of the concentrated solution removed through the filter does not exceed the combined volume of the refrigerant and purified water streams.

That which is claimed is:

1. A process for desalting aqueous salt solutions which comprises passing a liquefied volatile refrigerant into a body of said salt solution; evaporating said refrigerant so as to form ice crystals in said solution; removing vaporized refrigerant; withdrawing a slurry of ice crystals in concentrated brine from said body of solution; passing said slurry to the lower portion of a crystal purification zone; passing said slurry upwardly through said purification zone; separating and withdrawing concentrated brine from said slurry in said purification zone; intermittently introducing vaporized refrigerant to said purification zone at a point above the point of withdrawal of concentrated brine to melt ice crystals and to force water downwardly through remaining ice crystals; collecting liquid water and liquid refrigerant in the upper portion of said purification zone as two immiscible liquid phases at a temperature intermediate the freezing and vaporization points of said water and refrigerant; withdrawing and recovering liquid water; withdrawing liquid refrigerant; and returning said liquid refrigerant to said body of salt solution.

2. A process for desalting sea water which comprises passing a stream of sea water into a freezing zone maintained at a pressure less than atmospheric so that normal butane is vaporized at a temperature below the freezing point of water; passing a stream of liquid normal butane into the lower portion of said freezing zone; withdrawing a slurry of ice crystals in brine from the upper portion of said freezing zone and passing same to the lower portion of a crystal purification zone; passing said slurry upwardly through said purification zone; separating and withdrawing brine therefrom; withdrawing vaporized normal butane from the freezing zone; compressing said vaporized normal butane and passing same to said purification zone at a point above the point of brine withdrawal to melt ascending ice crystals and to condense said normal butane; subjecting materials in said purification zone to intermittent pressure pulsations; collecting liquid water and liquid normal butane in the upper portion of said purification zone as separate liquid phases; removing and recovering liquid water substantially free of salt; and removing liquid normal butane for recycle to said freezing zone.

3. The process of claim 2 wherein the pressure pulsations in the purification zone are obtained by intermittent introduction of vaporized normal butane into said purification zone.

4. The process of claim 2 wherein the pressure pulsations in the purification zone are obtained by withdrawing liquid from and reintroducing liquid to said purification zone.

5. The process of claim 2 wherein the pressure pulsations are in the order of about 30 to about 300 pulses per minute.

6. A process for concentrating an aqueous solution which comprises passing a stream of said solution to a freeze zone; passing a stream of liquid refrigerant into the lower portion of said freeze zone; maintaining the pressure in said freeze zone about 3 to 10 p.s.i.a. below the vapor pressure of the refrigerant at 32° F.; withdrawing a slurry of ice crystals in concentrated solution from said freeze zone; passing said slurry to the lower portion of a purification zone; passing said slurry upwardly through said purification zone; maintaining a pulsating pressure in said purification zone about 3 to 10 p.s.i.a. above the vapor pressure of the refrigerant at 32° F.; separating and withdrawing concentrated solution from said slurry in said purification zone; withdrawing vaporized refrigerant from said freeze zone; introducing vaporized refrigerant to said purification zone above the point of withdrawal of concentrated solution; removing liquid water from the upper portion of said purification zone; and removing liquid refrigerant from the upper portion of said purification zone.

7. The process of claim 6 wherein the refrigerant is normal butane.

8. The process of claim 6 wherein the refrigerant is propane.

9. The process of claim 6 wherein the refrigerant is isobutane.

10. The process of claim 6 wherein the refrigerant is a binary mixture of hydrocarbons.

11. Apparatus for separating liquid water from an aqueous solution comprising a pressure-tight freeze tank; means to introduce aqueous solution to said freeze tank; means to introduce volatile refrigerant to the lower portion of said freeze tank; means to withdraw a slurry of ice crystals in concentrated solution from said freeze tank; a crystal purification chamber; means to pass said slurry to the lower portion of said purification chamber; filter means in said purification chamber to remove concentrated solution from the slurry introduced thereto; means to remove vaporized refrigerant from said freeze tank and to pass same to said purification chamber at a point above the filter means; means to remove liquid water from the upper portion of said purification chamber; means to remove liquid refrigerant from the upper portion of said purification chamber and to pass same to the lower portion of said freeze tank; and means to maintain a pulsating pressure on said purification chamber.

12. The apparatus of claim 11 wherein the means for maintaining the pulsating pressure on the purification chamber is a pulse valve in the means to pass vaporized refrigerant from said freeze tank to said purification chamber.

13. The apparatus of claim 11 wherein the means for maintaining the pulsating pressure on the purification chamber is a piston and cylinder communicating with the interior of said chamber and means to reciprocate the piston in the cylinder.

References Cited in the file of this patent

UNITED STATES PATENTS 2,821,304     Zarchin _____ Jan. 28, 1958

OTHER REFERENCES

Carrier publication, "Development of a Direct-Freezing Continuous Wash-Separation Process for Saline Water Conversion," Research and Development Progress Report Number 23, pages 1–3 and FIGURES 1 and 2, January 1959.